US012691555B2

(12) United States Patent
Patterson

(10) Patent No.: US 12,691,555 B2
(45) Date of Patent: Jul. 28, 2026

(54) POWER TOOL WITH DEPLOYABLE APPENDAGE

(71) Applicant: Julian Patterson, Chicago, IL (US)

(72) Inventor: Julian Patterson, Chicago, IL (US)

( * ) Notice: Subject to any disclaimer, the term of this patent is extended or adjusted under 35 U.S.C. 154(b) by 0 days.

(21) Appl. No.: 18/742,454

(22) Filed: Jun. 13, 2024

(65) Prior Publication Data

US 2025/0010435 A1 Jan. 9, 2025

Related U.S. Application Data

(60) Provisional application No. 63/628,221, filed on Jul. 3, 2023.

(51) Int. Cl.
*B25B 21/00* (2006.01)

(52) U.S. Cl.
CPC .......... *B25B 21/002* (2013.01); *B25B 21/008* (2013.01)

(58) Field of Classification Search
CPC ..... B25B 21/002; B25B 21/008; B25B 21/00; B25B 23/0028; B25B 23/14; B25B 13/48; B25B 17/00
USPC .................................. 173/39, 216, 217, 170
See application file for complete search history.

(56) References Cited

U.S. PATENT DOCUMENTS 4,132,969 A 1/1979 Hillyard
5,421,180 A * 6/1995 Rojdev .................. B25G 1/005 74/528
6,048,260 A * 4/2000 Kopras ................. B24B 23/028 144/154.5
7,708,085 B2 5/2010 Decicco
9,144,895 B2 9/2015 Kearney
2003/0222607 A1* 12/2003 Simizu .................... B60L 50/52 318/139
2008/0281332 A1 11/2008 Taylor
2008/0289843 A1 11/2008 Townsan
2009/0031865 A1* 2/2009 Alberti .................... H02J 7/751 173/217
2014/0190715 A1 7/2014 Wong
2022/0061887 A1* 3/2022 Pett .................... A61B 17/3472

FOREIGN PATENT DOCUMENTS

WO 2022051306 A1 3/2022

OTHER PUBLICATIONS

International Search Report and Written Opinion of application No. PCT/US2025/033221, dated Oct. 22, 2025, 15 pp.

(Continued)

*Primary Examiner* — Jacob A Smith
(74) *Attorney, Agent, or Firm* — Greenberg Traurig, LLP

(57) ABSTRACT

The present disclosure relates to a power tool. The power tool can include an outer casing forming a housing, a motor, and a motor-driven appendage. The power tool can include a hinge mechanism having a hinge axis between an appendage-leg and a motor-leg, the appendage-leg comprising the motor-driven appendage and the motor-leg comprising an output shaft affixed to the motor. The housing can have an appendage port adjacent to the secured portion and capable of housing the unsecured portion. The motor-driven appendage can move between the closed state and the open state by hinging about the hinge axis and by passing through the aperture, laterally.

15 Claims, 11 Drawing Sheets

(56) References Cited

OTHER PUBLICATIONS

Amazon.com, 4-Speed Electric Mini Drill Pen, AM Arrowmax 10 Small Drill Bits with Aluminum Box, OLED Display, LED Lights, Resin Drill Set for Jewelry Making, Plastic, Wood (SDS Ultra), accessed Feb. 2024, 12 pp.

Amazon.com, Hoto Electric Screwdriver, 3.6V Cordless Screwdriver Set, All-in-One Design, USB-C Charging Cable, Manual & Electric, LED Shadowless Light, accessed Feb. 2024, 3 pp.

Amazon.com, Pkey Cordless Electric Screwdriver Set, Mini Electric Screwdriver, 28 Magnetic Bits, 3 Gears Torque, Two batteries, Rechargeable Portable Repair Tool Kit for Electronics Laptops Clocks Glasses Camera, accessed Feb. 2024, 11 pp.

ebay.com, Speed Hex FOSH2014 8V Battery Powered Screwdriver, accessed Feb. 2024, 4 pp.

* cited by examiner

POWER TOOL WITH DEPLOYABLE APPENDAGE

CROSS-REFERENCE TO RELATED PATENT APPLICATION

The present application claims the benefit of priority to U.S. Provisional Patent Application No. 63/628,221, filed Jul. 3, 2023 and the contents of which are incorporated herein by reference in its entirety.

FIELD OF INVENTION

The present disclosure relates generally to the field of power tools.

BACKGROUND

A tool can turn, rotate, loosen, or tighten a component, such as a screw, bolt, nut, or other connector or fastener. Some tools can be powered. For example, powered tools can include power drills, power screw-drivers, impact wrenches, or powered ratchets. Power tools can be utilized in a variety of industries to assemble, fix, or repair structures or equipment. For example, power tools can be used in the construction industry, the manufacturing industry, the automobile repair industry, etc.

SUMMARY OF THE INVENTION

Various embodiments relate to a power tool including a motor that drives an appendage. The appendage can be rotated by the motor in order to turn, tighten, or loosen a component, such as a fitting, a nut, a screw, a bolt, etc. The appendage can be deployable. The appendage can stow within a housing of the power tool, and deploy out of the housing when the user needs to use the tool. Because the appendage can be stowed, the power tool can be compact and have a reduced size. The power tool can include a hinge that rotates the appendage from within the housing to outside the housing through an opening in the housing. The hinge can include a set of gears that allow the appendage to rotate between the stowed and deployed positions, but also allow the motor to rotate the appendage about a longitudinal axis of the appendage.

Various embodiments relate to a power tool. The power tool can include an outer casing forming a housing. The power tool can include a motor. The power tool can include a motor-driven appendage having a distal end, a proximal end, a secured portion, and an unsecured portion, the secured portion positioned near the proximal end, anchoring the motor-driven appendage within the housing, and the unsecured portion consisting of a portion of the motor-driven appendage distal to the secured portion. The power tool can include a hinge mechanism having a hinge axis between an appendage-leg and a motor-leg, the appendage-leg comprising the motor-driven appendage and the motor-leg comprising an output shaft affixed to the motor. The housing can have an appendage port adjacent to the secured portion and capable of housing the unsecured portion. The outer casing can have an aperture creating consecutive space between the appendage port and a space external to the outer casing. The aperture can be shaped to allow the unsecured portion to pass through it, laterally and longitudinally. The motor-driven appendage can have a closed state and an open state, the closed state occurring when the unsecured portion occupies the appendage port to render the motor-driven appendage fully contained within the housing. The open state, occurring when the distal end of the motor-driven appendage is in the space external to the outer casing. The motor-driven appendage can move between the closed state and the open state by hinging about the hinge axis and by passing through the aperture, laterally.

Various other embodiments relate to a power tool including an outer casing with a length to width ratio of no more than 2:1. The outer casing can form a housing. The housing can contain a motor, a battery, and a microprocessor, not one of which is axially aligned with any other. The motor, the battery, and the microprocessor can be compactly arranged within the outer casing such that the outer casing fits within one's pocket and within a palm of one's hand.

Various other embodiments relate to a power tool including an outer casing forming a housing, a motor, and a motor-driven appendage having a distal end and a proximal end. The proximal end of the motor-driven appendage can be connected to a distal pinion gear, the distal pinion gear articulating with a bevel gear, either directly, or indirectly, through a plurality of gears. The bevel gear can be affixed to a lock-pin shaft, the lock-pin shaft extending perpendicularly from the bevel gear, in axial alignment. The bevel gear further can articulate with a proximal pinion gear, either directly or indirectly, through a plurality of gears. The proximal pinion gear can be affixed to an output shaft. The output shaft can be affixed to a motor. The lock-pin shaft can act as a hinge axis about which the motor-driven appendage hinges. The lock-pin shaft can engage to restrict the motor-driven appendage from hinging about the hinge axis in a locked position and disengaging to enable the motor-driven appendage to hinge about the hinge axis in an unlocked position. Wherein, in the locked position, but not the unlocked position, rotation of the proximal pinion gear translates to rotation of the motor-driven appendage through the proximal pinion gear's articulation with the bevel gear, either directly or indirectly, through the plurality of gears, and through the bevel gear's articulation with the distal pinion gear, either directly or indirectly, through the plurality of gears.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying diagrams.

DETAILED DESCRIPTION

The present disclosure relates to a power tool. A tool can include an appendage. The appendage can rotate about its own longitudinal axis in order to turn, tighten, or loosen a component, such as a fitting, a nut, a screw, a bolt, etc. The tool can be a manual tool, e.g., a tool which a user manually operates. Manual tools can be used in a variety of fields, for example, in automobile repair, in manufacturing, in maintenance, in home improvement, etc. Furthermore, manual tools can be used by funeral directors to operate coffins. For example, a coffin may include various bolts which raise or lower a platform of the coffin, open or close the coffin, open or close memory drawers of the coffin, etc. In the funeral field, and in other fields, a power tool, such as a power drill, may be too loud, too large, or not sufficiently portable to be used.

The present power tool can include a motor that drives an appendage (e.g., a motor-driven appendage). The appendage can rotate about its own longitudinal axis in order to turn, tighten, or loosen a component, such as a fitting, a nut, a screw, a bolt, etc. The appendage can be deployable. The appendage can stow within a housing of the power tool, and deploy out of the housing when the user needs to use the tool. By stowing and deploying the appendage, the power tool can be compact and light, and the size of the power tool can be reduced. For example, the power tool can be small enough to fit in a person's pocket or within the palm of a person's hand. The power tool can include a hinge that rotates the appendage from within the housing to outside the housing through an opening in the housing. The hinge can include a set of gears that allow the appendage to rotate between the stowed and deployed positions, but also allow the motor to rotate the appendage about a longitudinal axis of the appendage.

If the power tool is used for operating a funeral casket, the power tool can provide a convenient alternative to manual casket cranking or a loud power drill. The power tool can be battery powered and motorize a casket key. The power tool can include a sound dampening material to dampen the sound of the motor and maintain a quiet environment. The shaft of the power tool can fit into an inner casket female receiver or keyhole socket. The power tool can adjust a bed platform of a casket, lock or unlock gasketed or sealed caskets, or open or close a memory drawer of the casket.

Figure 1:
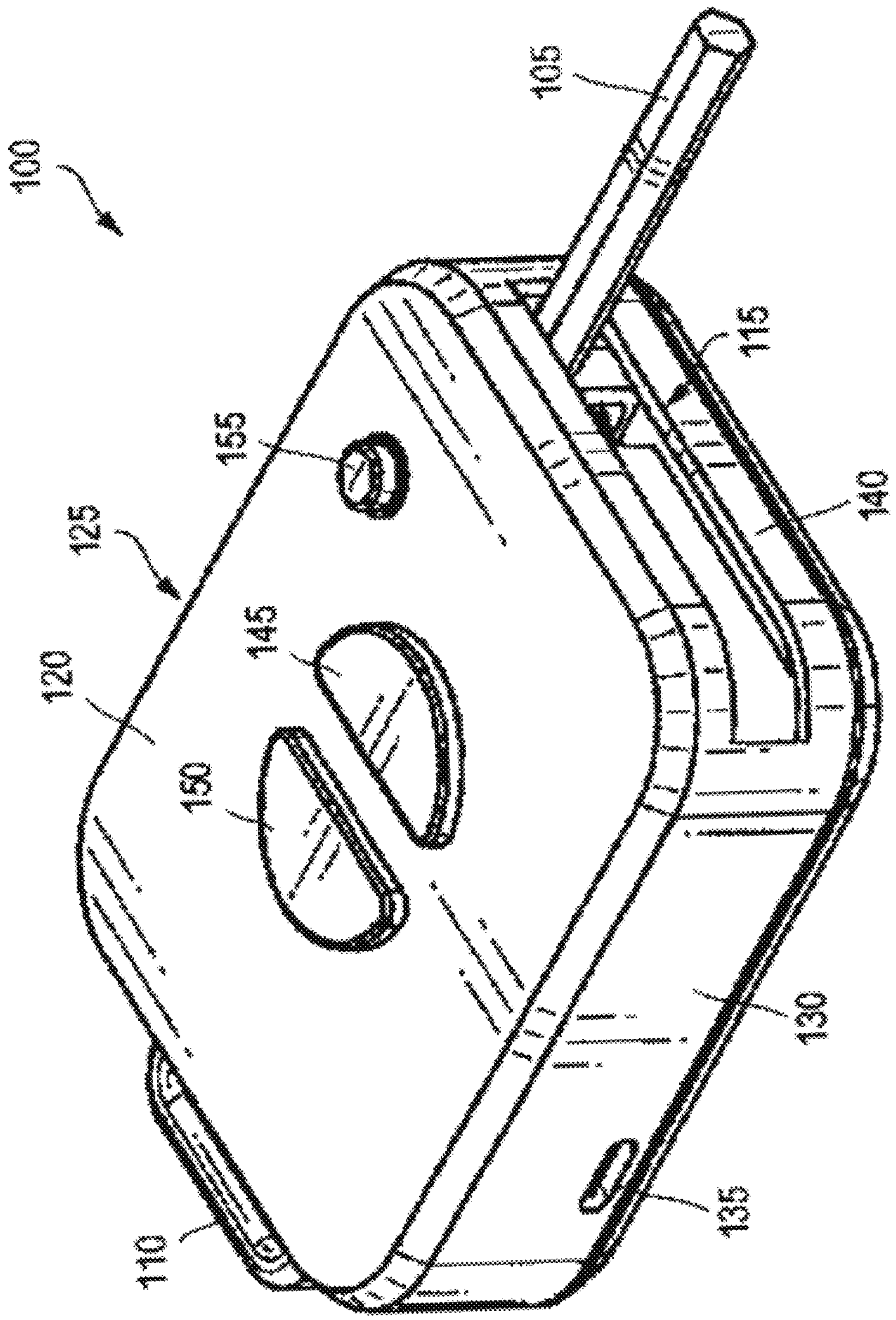
FIG. 1 is a perspective view of a power tool including a deployed appendage, according to an example embodiment.

FIG. 1 is a perspective view of an apparatus 100 including a deployed appendage 105, according to an example embodiment. The apparatus 100, can be a tool, a power tool, a portable tool, a system, or a component. The apparatus 100 can include at least one housing 125. The housing 125 can be made from a plastic material, such as a polycarbonate, polyamide, polypropylene, or a metal material, such as tin, aluminum, or steel. The housing 125 can be an outer casing of the apparatus 100. For example, an outer casing of the apparatus 100 can include outer sides or outer surfaces that form a housing. The housing 125 can be a case that forms or includes a cavity, space, or inner area to store components of the apparatus 100. The housing 125 can be a prismatic shaped housing, a cube shaped housing, or any other shaped housing. The housing 125 can include a top side 120, a lateral side 130, and a front side 140. The lateral side 130 can include an opening 135 for connecting a cable or charger to a port of the apparatus 100. The opening 135 can be oval shaped, circular shaped, stadium shaped, etc.

The housing 125 can be compact, such that the housing 125 can fit within a person's pocket or be held in a person's palm or hand. The outer surfaces of the housing 125 can have a length to width ratio of no more than 2:1. For example, the length of the housing 125 can be 3 inches, while the length can be 1.5 inches. In some implementations, the length of the housing 125 is 2.9-3.1 inches, 2.8-3.2 inches, less than 2.8 inches, or more than 3.2 inches. In some implementations, the width of the housing 125 is 1.4-1.6 inches, 1.3-1.7 inches, less than 1.3 inches, or more than 1.7 inches. In some implementations, a height of the housing 125 is 0.5 inches. In some implementations, a height of the housing 125 is 0.4-0.6 inches, 0.3-0.7 inches, less than 0.3 inches, or more than 0.7 inches.

The housing 125 can contain a motor, a battery, a computing system where not one of which are axially aligned with one another. The motor, the battery, and the computing system can be compactly arranged within the housing 125 such that the housing 125 fits within a person's pocket (such as a front pants pocket, rear pants pocket, shirt pocket, etc.) or within a person's palm or hand.

The apparatus 100 can include an appendage 105. The appendage 105 can be made from a metal material, such as aluminum, steel, or chrome platted steel. The appendage 105 can be a motor driven appendage with a proximal and distal end. The appendage 105 can be an elongated member, such as a shaft, a pin, or a spindle. The appendage 105 can have a hexagonal prism shape. The appendage 105 can have a cylindrical shape. The appendage 105 can include an end that couples with a component such as a screw, bolt, nut, socket, keyhole, or other component. The end can be integrally formed with a body of the appendage 105. The end can be coupled with the body of the appendage 105. The end can be an Allen key, a Phillips screw driver, a flathead screwdriver, or a socket. The end can be integrally formed with the body of the appendage 105. The end can be coupled with the body of the appendage 105. The end can be a removable component that a user can remove and install. For example, a user could remove an Allen key end from the appendage 105, and replace the Allen key end with a Phillips screw driver end.

The front side 140 can include at least one slot 115. The slot 115 can be an opening or space in the front side 140 that allows the appendage 105 to deploy, move, or turn through. The slot 115 can be an aperture. The aperture can be shaped to allow an unsecured portion of the appendage 105 to pass through. The appendage 105 can pass through the slot 115 laterally and longitudinally. The slot 115 can run along a length of the front side 140. The apparatus 100 can include at least one button 155. The button 155 can cause the appendage 105 to deploy or retract. Responsive to the button 155 being pressed or interacted with, the appendage 105 can be released from within the housing 125. The appendage 105 can turn and move through the slot 115. The appendage 105 can rotate until the appendage 105 is positioned as shown in FIG. 1. The appendage 105 can rotate until the appendage 105 is perpendicular with a surface of the front side 140. In a stowed position within the housing 125, the appendage 105 can be spring loaded or piston loaded, such that when the button 155 is pressed, the appendage 105 is unlocked and the spring or piston load turns the appendage 105 to deploy. The spring or piston can bias the appendage 105 to the deployed position shown in FIG. 1.

The apparatus 100 can include at least one input device 145 or at least one input device 150. A user can interact with the input devices 145 and 150 to cause a motor to operate to turn the appendage 105. For example, if a user presses the first input device 145, the appendage 105 can rotate about a longitudinal axis of the appendage 105 in a first direction. If a user presses the second input device 150, the appendage can rotate about the longitudinal axis of the appendage 105 in a second direction. The first and second directions can be opposite directions, e.g., clockwise and counterclockwise.

The apparatus 100 can include at least one loop 110. The loop 110 can be made from a plastic material, such as a polycarbonate, polyamide, polypropylene, or a metal material, such as tin, aluminum, or steel. The loop 110 can be integrally formed with the housing 125. The loop 110 can be a component separate from the housing 125 that is coupled with the housing 125. The loop 110 can include a first end and a second end that couple with the housing 125. The loop 110 can be a closed loop, such that the loop 110 can be attached to a keyring.

Figure 2:
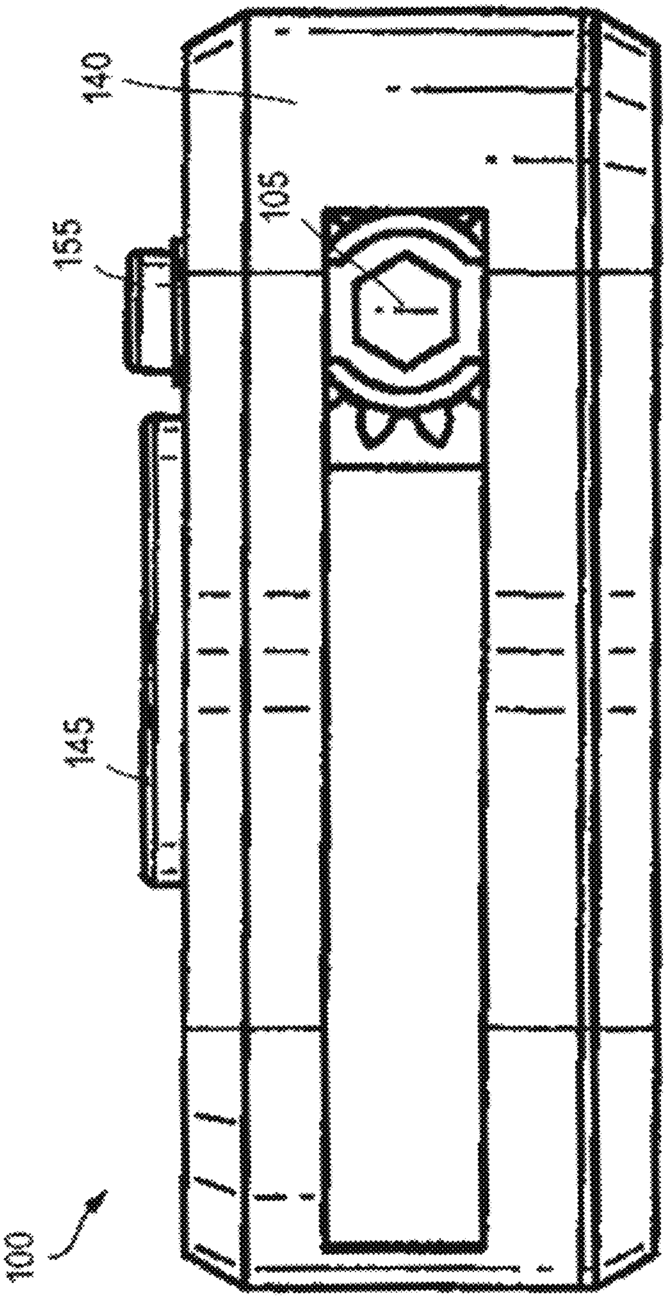
FIG. 2 is a front view of the power tool of FIG. 1 including a deployed appendage, according to an example embodiment.

FIG. 2 is a front view of the apparatus 100 including a deployed appendage 105, according to an example embodiment. The slot 115 can be offset in the front side 140. For example, a first distance between an end of the slot 115 and the lateral side 130 can be less than a distance between an opposite end of the slot 115 and an opposite lateral side of the housing 125.

The button 155, the input device 145, and the input device 150 can be raised, such that the top surfaces of the buttons extend past the top surface of the top side 120 of the housing 125. Because the button 155, the input device 145, and the input device 150 are raised, a user can more easily interact with the button 155, the input device 145, and the input device 150 respectively. In some embodiments, the button 155, the input device 145, or the input device 150 can be flush with, or sunken under, the top side 120 of the housing 125. This can reduce the dimensions of the apparatus 100, and make the apparatus 100 more compact.

Figure 3:
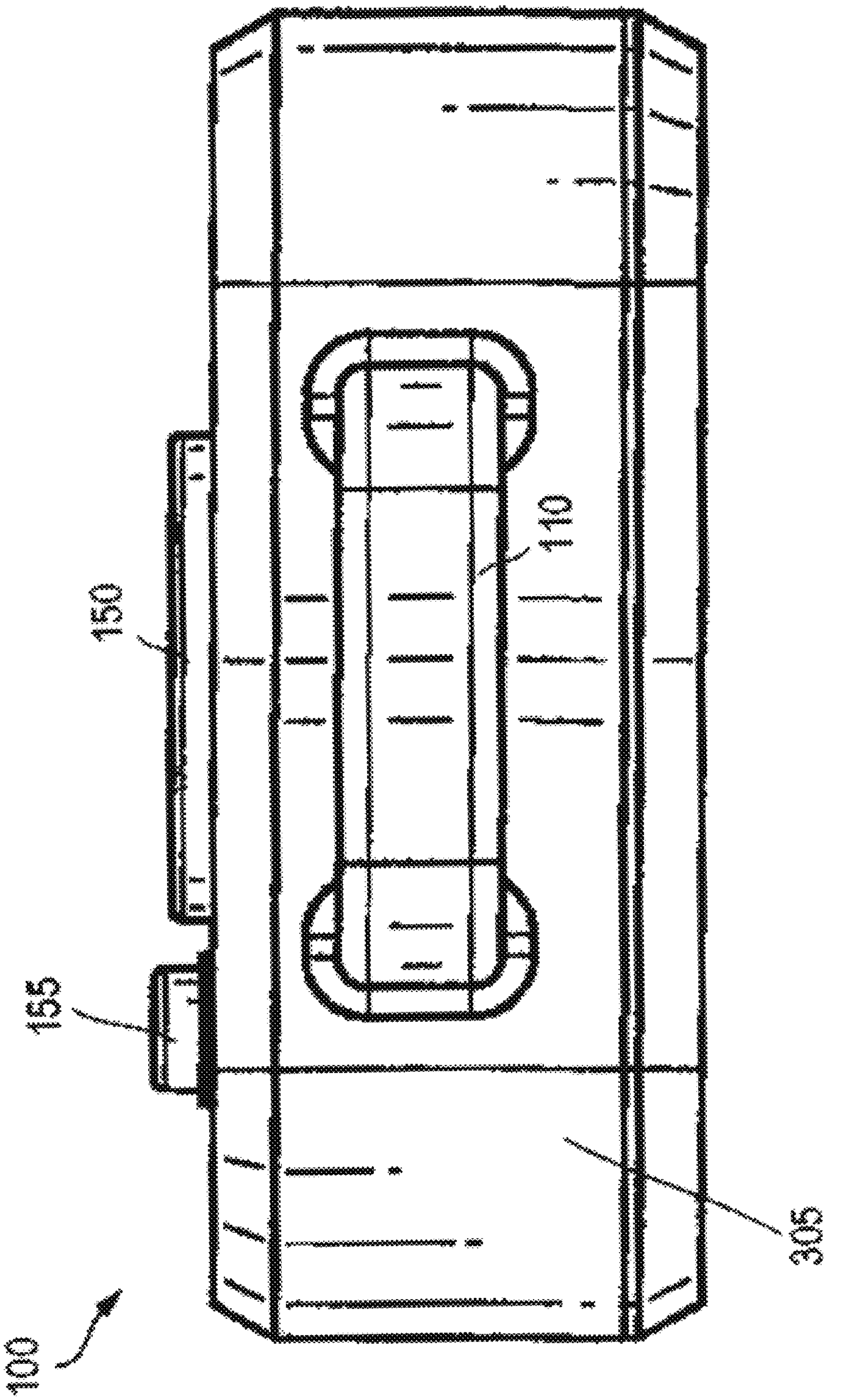
FIG. 3 is a rear view of the power tool of FIG. 1 including a loop to couple with a keyring, according to an example embodiment.

FIG. 3 is a rear view of the apparatus 100 including the loop 110 to couple with a keyring, according to an example embodiment. For example, the loop 110 can have a toroid shape or a prismatic shape. The loop 110 can be a plastic material or a metal material. The loop 110 can be a full loop or a partial loop. In some embodiments, the loop 110 can be a full loop that has no beginning or end, and a portion of the full loop 110 can be coupled with a back side 305 of the housing 125. In some embodiments, the loop 110 is a partial loop, where ends of the loop 110 couple with the back side 305 of the housing 125. A first end of the loop 110 can extend outwards away from the back side 305 to a body of the loop 110. A second end of the loop 110 can extend from the body of the loop 110 to the surface of the back side 305. At least a portion of the back side 305 and the loop 110 can form a closed ring, such that a keychain, keyring, lanyard, or other component that extends around the loop 110 is secured to the loop 110.

Figure 4:
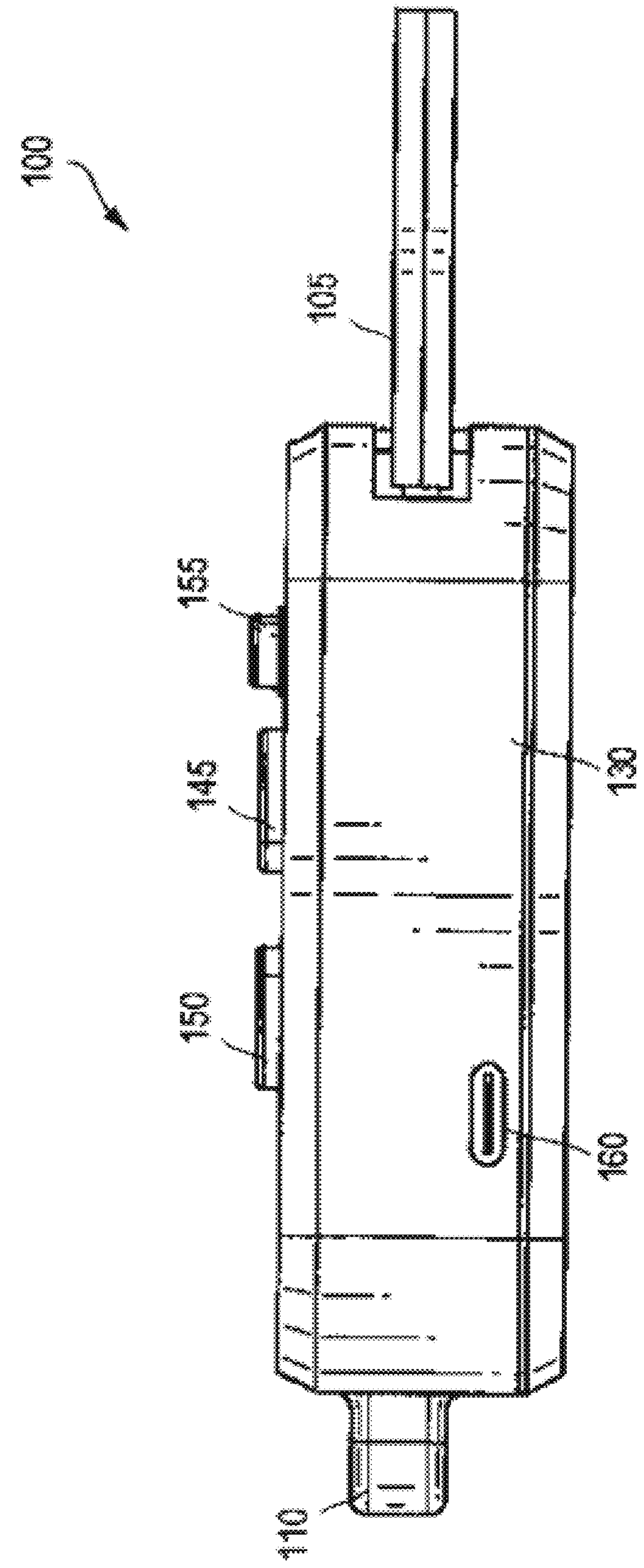
FIG. 4 is a side view of the power tool of FIG. 1 including a port, according to an example embodiment.

FIG. 4 is a side view of the apparatus 100 including at least one port 160, according to an example embodiment. The port 160 can be a charging port or a communication port for a computing system, microprocessor system, a battery system, a power system, or an electronic system of the apparatus 100. The port 160 can be a universal serial bus type A (USB-A) port, a USB type C port (USB-C), a power port, or any other type of port. The lateral side 130 can include an opening to allow access to the port 160. The opening in the lateral side 130 can be the same size as a cross-section of the port 160, or can be larger than the cross-section of the port 160.

Figure 5:
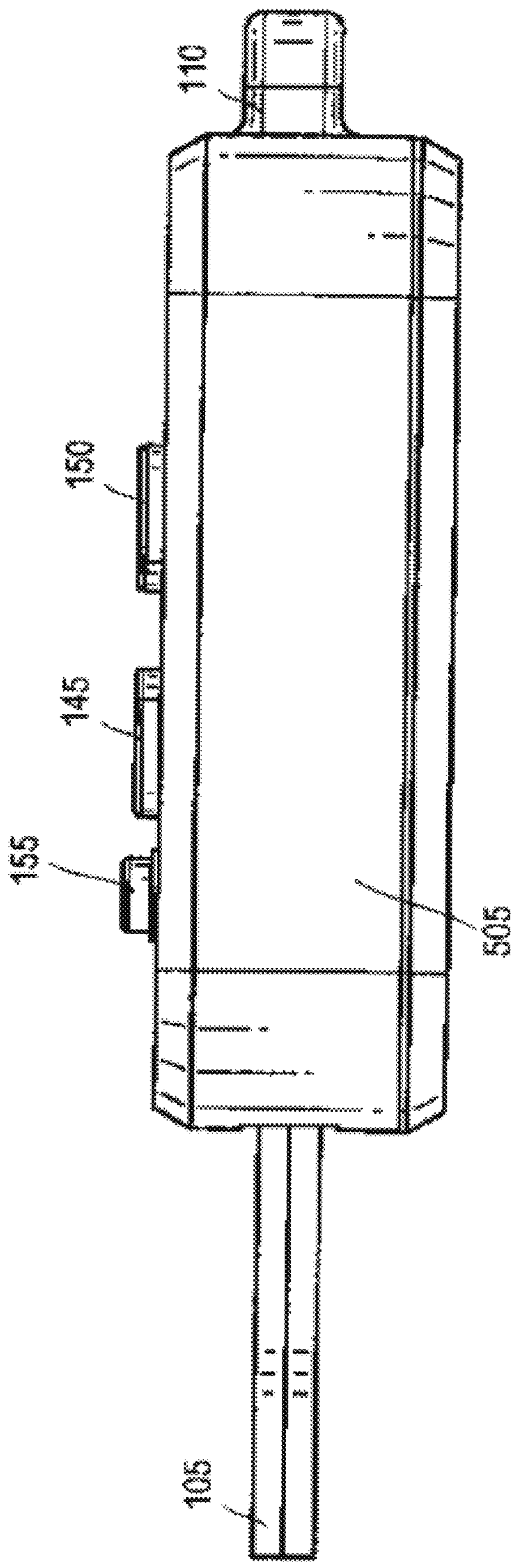
FIG. 5 is another side view of the power tool of FIG. 1, according to an example embodiment.

FIG. 5 is another side view of the apparatus 100, according to an example embodiment. The housing 125 can include a lateral side 505. The lateral side 505 can be opposite the lateral side 130. The lateral side 505 can be parallel with the lateral side 130. The lateral side 505 can extend from the back side 305 of the housing 125 to the front side 140 of the housing 125. The lateral side 505 can extend from a bottom side of the housing 125 to the top side of the housing 125.

Figure 6:
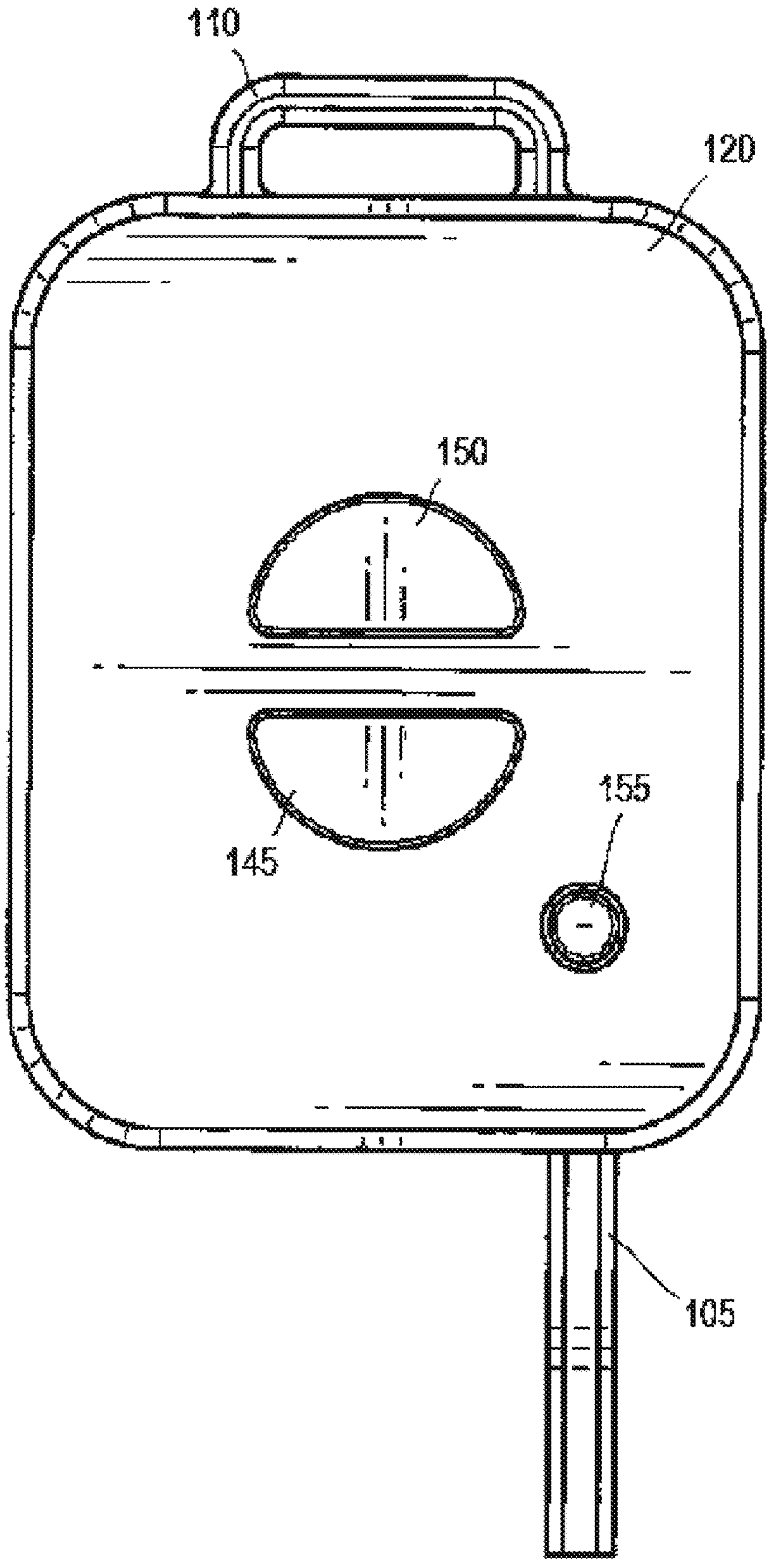
FIG. 6 is a top view of the power tool of FIG. 1 including input devices, according to an example embodiment.

FIG. 6 is a top view of the apparatus 100 including input devices 145 and 150, according to an example embodiment. The housing 125 can include the top side 120. The top side 120 can include openings for the input device 145, the input device 150, and the button 155. Cross-sections of the input devices 145 and 150 can have a half circle shape. In some embodiments, the cross-sections of the input devices 145 and 150 can have square shapes, triangular shapes, or circular shapes. A cross-section of the button 155 can have a circular shape. In some embodiments, the cross-section of the button 155 can have a square shape, a triangular shape, or a half circle shape.

The top side 120 can be a flat planar surface. The top side 120 can extend between the front side 140, the back side 305, the lateral side 130, and the lateral side 505. The top side 120, the front side 140, the back side 305, the lateral side 130, and the lateral side 505 can be integrally formed with. The top side 120, the front side 140, the back side 305, the lateral side 130, and the lateral side 505 can be coupled with one another.

Figure 7:
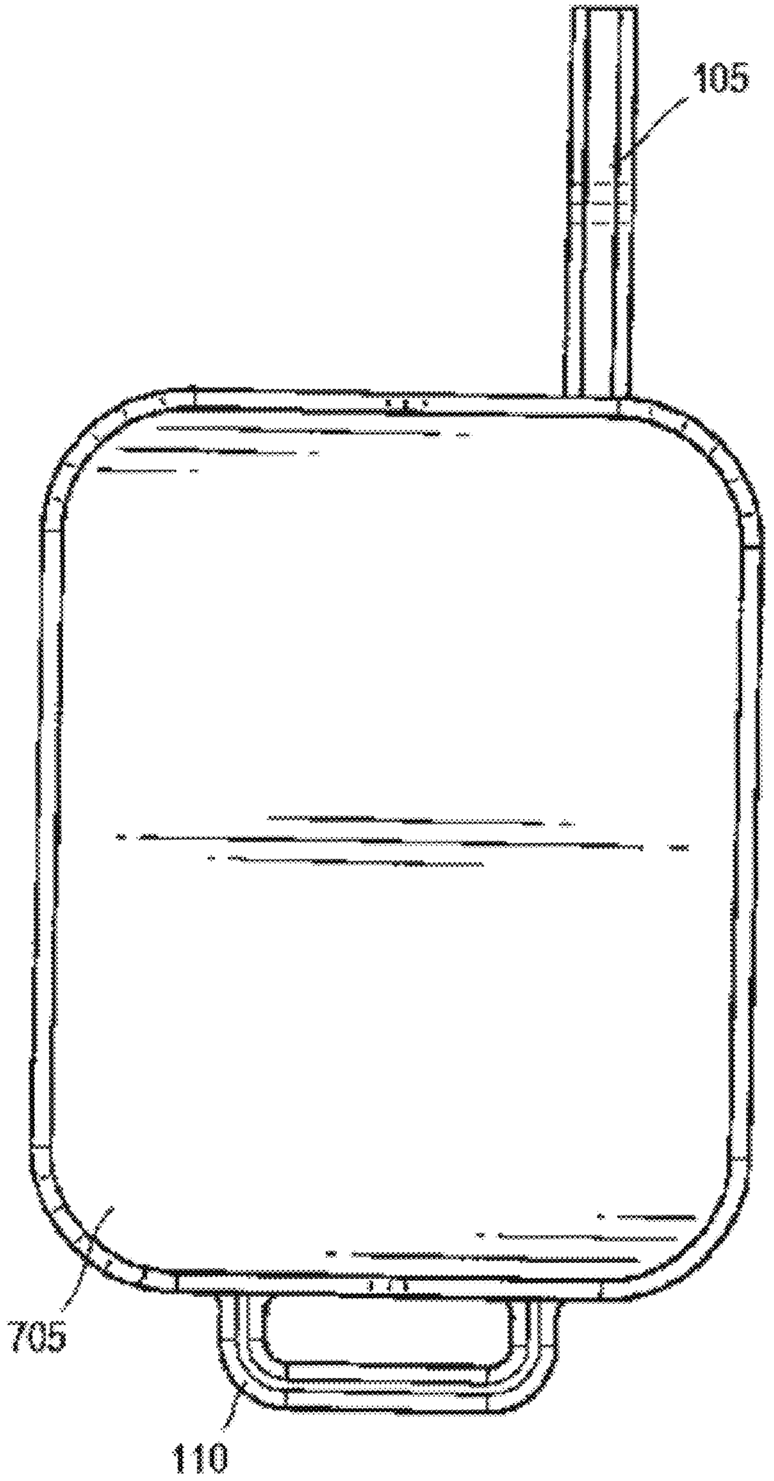
FIG. 7 is a bottom view of the power tool of FIG. 1, according to an example embodiment.

FIG. 7 is a bottom view of the apparatus 100, according to an example embodiment. The bottom side 705 can be a flat planar surface. The bottom side 705 can be opposite the top side 120. The bottom side 705 can be parallel with the top side 120. The bottom side 705 can extend between the front side 140, the back side 305, the lateral side 130, and the lateral side 505. The bottom side 705 can be integrally formed with the front side 140, the back side 305, the lateral side 130, and the lateral side 505. The bottom side 705 can be coupled with the front side 140, the back side 305, the lateral side 130, and the lateral side 505.

Figure 8:
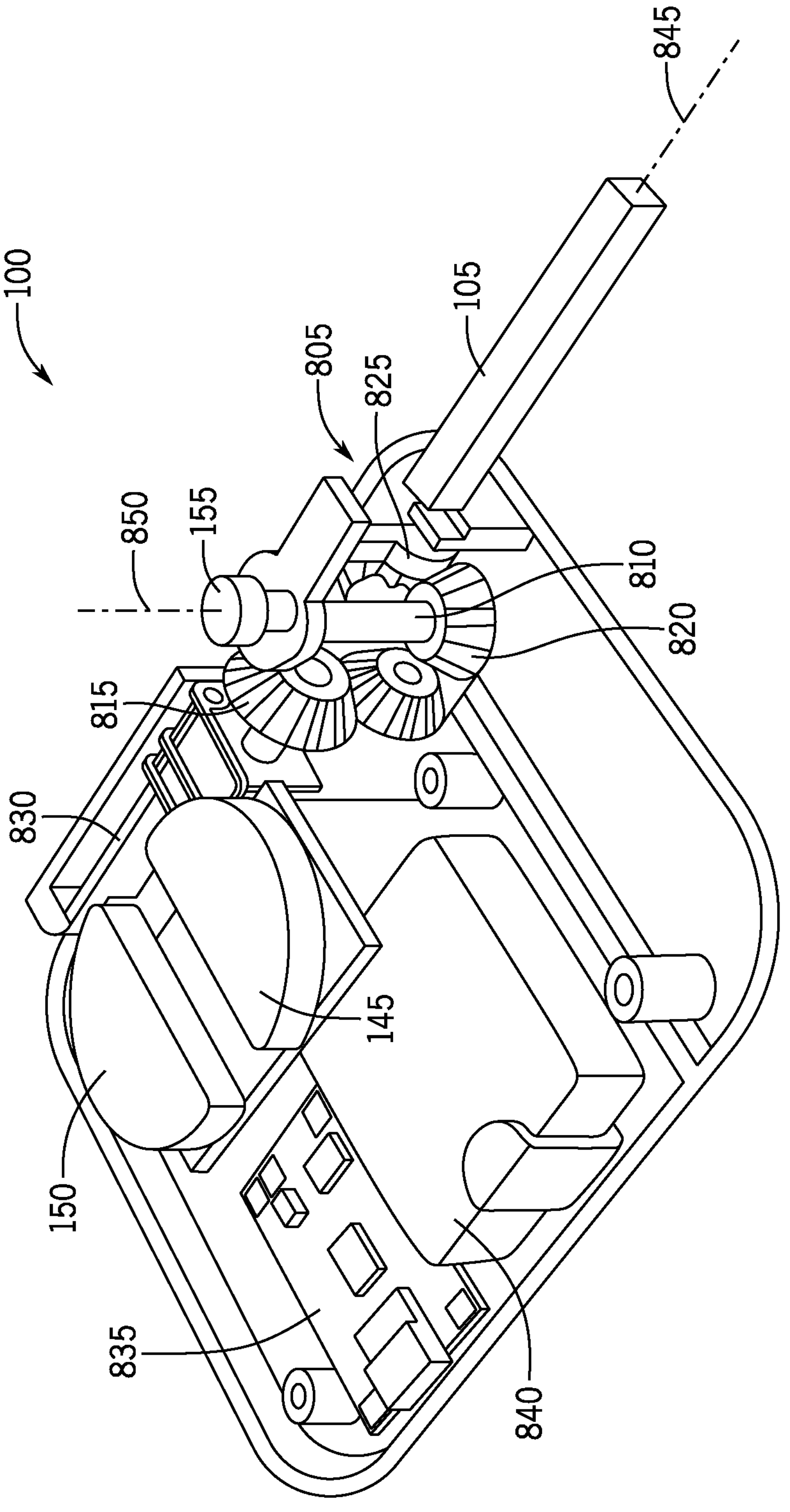
FIG. 8 is a perspective view of the power tool of FIG. 1 without a housing, the power tool including a deployed appendage, according to an example embodiment.

FIG. 8 is a perspective view of the apparatus 100 without the housing 125 when the appendage 105 is deployed, according to an example embodiment. In FIG. 8, the bottom side 705 is shown, but the front side 140, the back side 305, the lateral side 130, and the lateral side 505 are removed. The apparatus 100 can include at least one computing system 835. The computing system 835 can be a microprocessor system, such as a reduced instruction set computer (RISC) processor, a microcontroller, an application specific integrated circuit, a logic circuit, etc. The computing system 835 can be or include a circuit board, such as a printed circuit board, that a processor is coupled with. The computing system 835 can include the port 160. Via the port 160, another computing system can communicate with the computing system 835 or program or flash the computing system 835.

The computing system 835 can include a power system, such as a power converter, a power regulator, or a charging circuit. The computing system 835 can receive power from a power source via the port 160. The computing system 835 can charge at least one battery 840. The apparatus 100 can include at least one battery 840. The battery 840 can be a lithium-ion battery, a nickel cadmium battery, an alkaline battery, etc. The battery 840 can be a rechargeable battery, in some embodiments. The computing system 835 can be electrically coupled with the battery 840. The computing system 835 can charge the battery 840 via power received from the port 160. The computing system 835 can control the battery 840 to discharge or provide power to at least one motor 830.

The apparatus 100 can include at least one motor 830. The motor 830 can be a brushless direct current (DC) motor, a brushed DC motor, a servo motor, a permanent magnet motor, an alternating current motor, an induction motor, etc. The computing system 835 or the battery 840 can be electrically coupled with the motor 830. For example, the computing system 835 can include at least one motor controller that generates a signal to control the speed, torque, or direction of rotation of the motor 830. The computing system 835 can cause the battery 840 to discharge to power the motor 830 to cause the motor 830 to rotate, change directions, provide holding torque in a specific position, etc.

The computing system 835 can be electrically coupled with the input device 145 and the input device 150. The computing system 835 can receive a signal to detect a user interaction with the input device 145 or the input device 150. The signal can be a logic signal or an analog signal. The computing system 835 can operate the motor 830 responsive to an input received from the input device 145 or the input device 150. For example, the computing system 835 can receive a signal indicating that a user interacted with the input device 145. The computing system 835 can cause the battery 840 to discharge to operate the motor 830 to turn the appendage 105 along a longitudinal axis 845 of the appendage 105 in a first direction (e.g., clockwise). The computing system 835 can receive a signal indicating that a user interacted with the input device 150. The computing system 835 can cause the battery 840 to discharge to operate the motor 830 to turn the appendage 105 along a longitudinal axis 845 of the appendage 105 in a second direction (e.g., counterclockwise).

Figure 9:
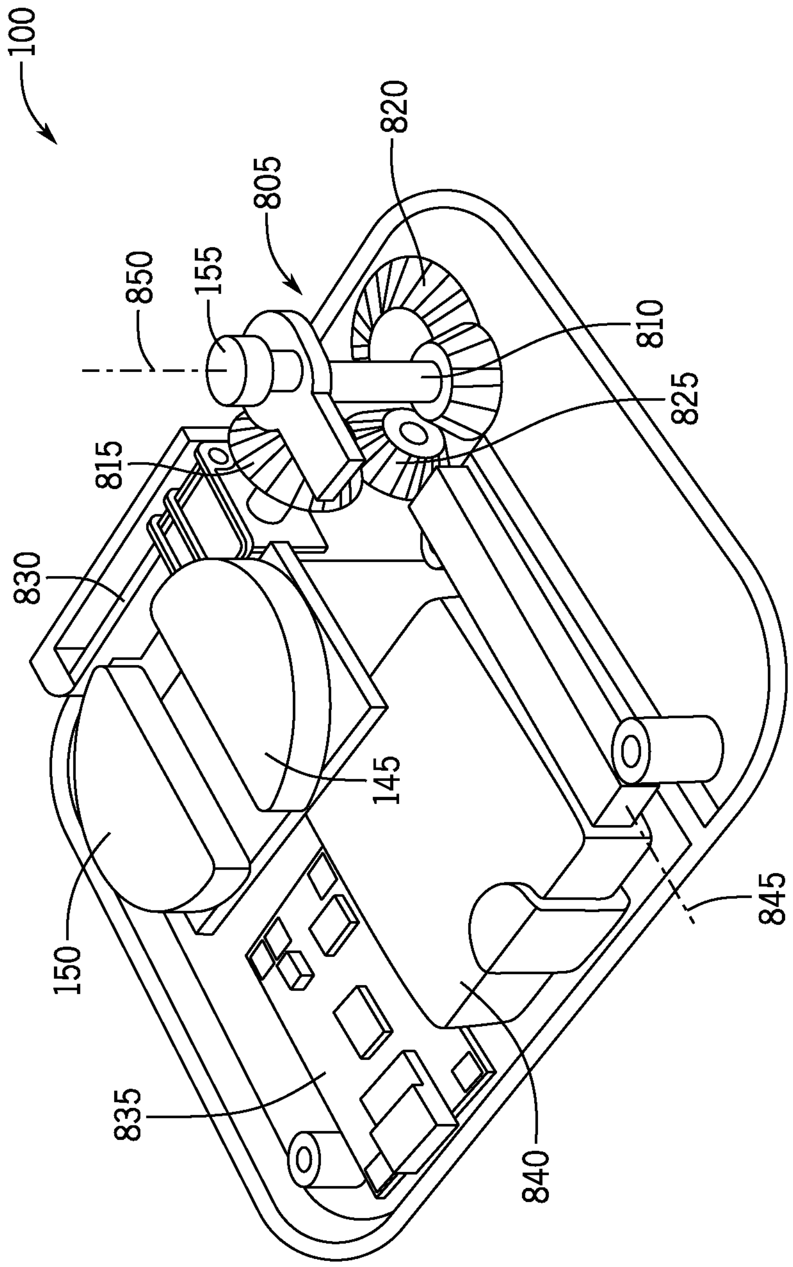
FIG. 9 is a perspective view of the power tool of FIG. 1 without a housing, the power tool including a deployed appendage, according to an example embodiment.

FIG. 9 is a perspective view of the apparatus 100 without a housing 125 when the appendage 105 is stowed, according to an example embodiment. The apparatus 100 can include a hinge 805. The hinge 805 can be a hinge mechanism having a hinge axis or longitudinal axis 850. The longitudinal axis 850 and the longitudinal axis 845 can be perpendicular with one another. The appendage 105 can move between the stowed and deployed positions by hinging about the longitudinal axis 850 and passing through the slot 115 laterally.

The hinge 805 can rotate the appendage 105 between a stowed position (or locked state) shown in FIG. 9 and the deployed position (or unlocked state) shown in FIG. 8. In the closed state, an unsecured portion of the appendage 105 can be fully contained within the housing 125. In the deployed position, a distal end of the appendage 105 can be outside the housing 125. The hinge 805 can include at least one lock-pin shaft 810. The lock-pin shaft 810 can engage to render the appendage 105 in a locked position. The lock-pin shaft 810 can disengage to render the appendage 105 in an unlocked position. In the locked position, the lock-pin shaft can restrict movement or hinging of the appendage 105 about the longitudinal axis 850. In the unlocked position, the lock-pin shaft 810 can allow or enable the appendage 105 to hinge or move about the longitudinal axis 850. The lock-pin shaft 810 can include an angled hinge-blade that maintains the appendage 105 perpendicularly to the lock-pin shaft 810.

The button 155 can be coupled with a top or end of the hinge 805. The button 155 can be coupled with a top or end of the lock-pin shaft 810. The button 155 can be pressed to lock or unlock the hinge 805. For example, the hinge 805 can include a locking apparatus that holds the appendage 105 in a position, e.g., in the deployed or stowed position. A spring or tension member can bias the appendage 105 to one of the stowed or deployed positions. Responsive to the button 155 being pressed, the hinge 805 can unlock, allowing the appendage 105 to move or swing. The spring or tension member can move the appendage 105, via the hinge 805 to the biased position. For example, if the appendage 105 is stowed inside the housing 125, and the button 155 is pressed, the spring or tension member can cause the appendage 105 to rotate on the hinge 805 to the deployed position.

The apparatus 100 can include at least one gear 820. The gear 820 can be a bevel gear. The gear 820 can share the longitudinal axis 850 with the hinge 805. The gear 820 can rotate about the longitudinal axis 850. The apparatus 100 can include at least one gear 815. The gear 815 can be a proximal pinion gear coupled with an output shaft of the motor 830. The gear 815 can share the longitudinal axis 845 with the appendage 105 when the appendage 105 is in the deployed position. The gear 815 can be coupled with a shaft, rotor, end, pin, motor-leg, or member of the motor 830. The gear 815 can be fixed to a shaft of the motor 830, such that when the motor 830 turns the shaft, the gear 815 turns. In this manner, the shaft may be functionally affixed to the motor-leg of the motor 830. The gear 815 and the gear 820 can be engaged with one another, such that when the gear 815 rotates about the longitudinal axis 845, the gear 820 can rotate about the longitudinal axis 850. The motor 830 can spin the gear 815 to rotate the gear 820. The gear 815 can articulate with the gear 820 either directly, or indirectly through one or multiple other gears (not shown).

The appendage 105 can be coupled with a gear 825. The gear 825 and the gear 820 can engage with one another. The gear 825 can be a distal pinion gear coupled with a portion, such as an appendage-leg of the appendage 105 including a proximal end. The gear 825 can be fixed with the appendage 105, such that when the gear 825 turns, the appendage 105 turns about the longitudinal axis 845. The gear 825 can share the longitudinal axis 845 with the appendage 105. At least a portion of the appendage 105 can be coupled with the lock-pin shaft 810. For example, a secured portion of the appendage 105 near a proximal end of the appendage 105 can anchor the appendage 105 within the housing 125. An unsecured portion of the appendage 105 can be distal to the secured portion of the appendage 105. A portion of the appendage 105 can include an opening that fits about a body of the hinge 805. The opening in the portion of the appendage 105 can allow the appendage 105 to rotate about the longitudinal axis 850.

When the appendage 105 moves between the stowed and deployed positions, the gear 815 and the gear 820 can be fixed and may not turn. For example, the hinge 805 can lock the gear 820 from turning, or a holding torque of the motor 830 can prevent the gears 815 or 820 from turning. With the gear 820 fixed or not moving, the gear 825 can turn along at least a portion of the circumference of the gear 820 to move the appendage 105 between the stowed or deployed position. In the deployed position, at least a portion of the appendage 105 can lock with the hinge 805 via a locking mechanism, preventing the appendage 105 from rotating about the longitudinal axis 850. In the deployed position, the motor 830 can drive the gear 815, which in turn can drive the gear 820, which in turn can drive the gear 825. When the gear 825 is driven, the appendage 105 can rotate about the longitudinal axis 845. The gear 825 can articulate with the gear 820 directly, or indirectly through one or multiple other gears (not shown). The appendage 105 can hinge about the longitudinal axis 850 using the articulation of the gear 825 with the gear 820, either directly, or indirectly through one or more other gears (not shown).

The apparatus 100 can have different dimension measurements when the appendage is in the stowed or deployed positions. For example, the apparatus 100 can have a first dimension measurement and a second dimension measurement. The first dimension measurement can exist when an end of the appendage 105 is external to the housing 125 and when the appendage 105 is perpendicular to the housing 125. The second dimension measurement can exist when the appendage 105 is fully contained within the housing 125. The first dimension measurement and the second dimension measurement having a ratio of at least 5:4. The appendage 105 can move to cause the apparatus 100 to have the first dimension measurement or the second dimension measurement.

Although not shown in FIGS. 1-9, the apparatus 100 can include a speed switch, speed wheel, or speed control wheel. The speed switch can be electrically coupled or communicate with the battery 840, the motor 830, or the computing system 835. When the speed switch is manipulated, the speed at which the appendage 105 rotates can be varied. For example, the computing system 835 can operate the motor 830 based on a setting or value indicating a speed for the appendage 105. The computing system 835 can receive a signal from the speed switch that indicates the setting or value for the speed of the appendage 105. The speed control wheel can provide a signal that speeds up or slows down the rotation of the appendage 105. In some implementations, the speed control wheel operates a gear box, which allows the motor 830 to switch gears to provide different speeds for the appendage 105.

Although not shown in FIGS. 1-9, the apparatus 100 can include a sound dampening material or decibel lowering device. The dampening material can be disposed within the housing 125 to minimize or reduce sound emission of the motor 830. The dampening material can be a porous absorber, such as a fibrous mineral wool or glass fiber, open-cell foam, or other material.

Figure 10:
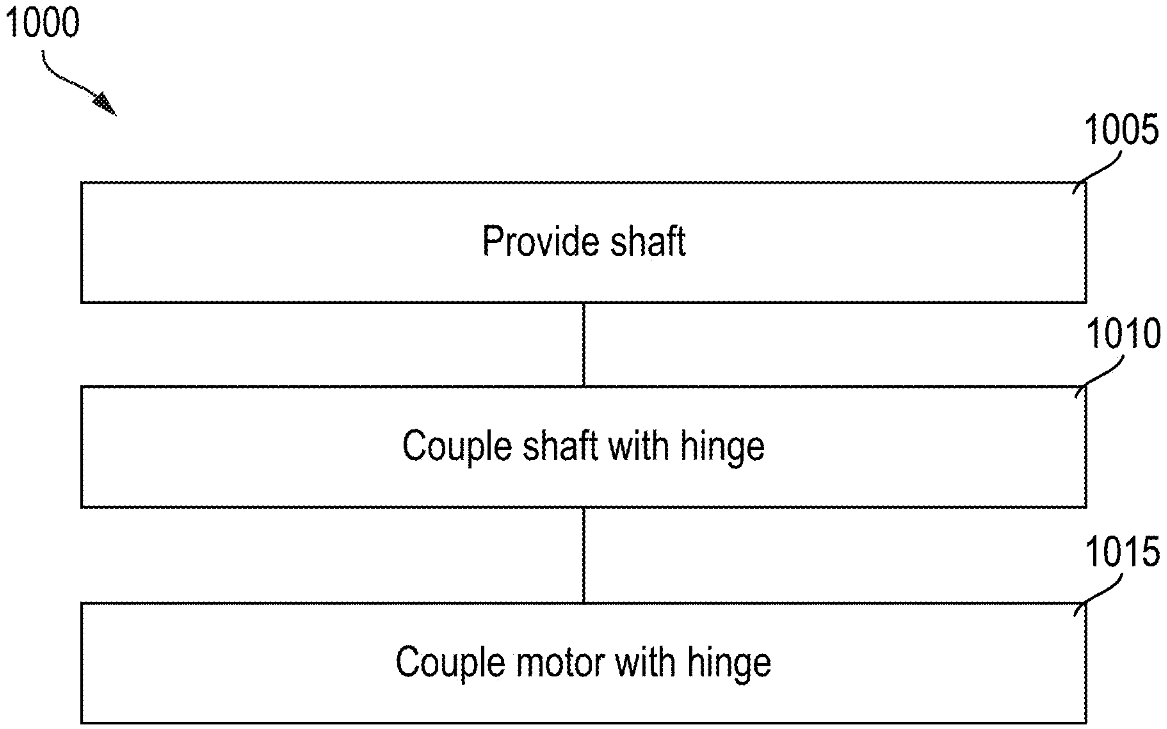
FIG. 10 is a method of manufacturing the power tool of FIG. 1, according to an example embodiment.

FIG. 10 is a method 1000 of manufacturing the apparatus 100, according to an example embodiment. The method 1000 can be performed by an assembly system or apparatus. For example, a manufacturing apparatus, manufacturing system, or electronically or mechanically controlled system can perform at least a portion of the method 1000 to assemble, build, form, or manufacture the apparatus 100. The method 1000 can include an block 1005 of providing a shaft. The method 1000 can include an block 1010 of coupling the shaft with a hinge. The method 1000 can include an block 1015 of coupling a motor with the hinge.

At block 1005, the method 1000 can include providing an appendage 105. For example, the method 1000 can include manufacturing, casting, cutting, or forming the appendage 105. For example, the method 1000 can include forming an appendage 105 with an end to turn a component. For example, the appendage 105 can be formed to include an end integrally formed with a body of the appendage 105 that has a shape to couple with, and turn a component. In some embodiments, the method 1000 can include forming a body of the appendage 105, and separately forming an end for the appendage 105. The end can be a hexagonal key, an Allen key, a Phillips bit, a flat head bit, etc. The method 1000 can include coupling, attaching, or fixing the end to the body of the appendage 105.

At block 1010, the method 1000 can include coupling an appendage 105 with a hinge 805. The appendage 105 can be coupled with the hinge 805. For example, at least a portion of the appendage 105 can fit around a body of the hinge 805, allowing the appendage 105 to turn about the longitudinal axis 850 of the hinge 805. Furthermore, the hinge 805 can be coupled with at least one gear 820. A gear 825 of the appendage 105 can couple with the gear 820 of the appendage 105. For example, gear teeth of the gear 825 and gear teeth of the gear 820 can couple with one another.

At block 1015, the method 1000 can include coupling a motor 830 with a hinge 805. The motor 830 can include a shaft that can be coupled with a gear 815. The gear 815 can be coupled with the gear 820 of the hinge 805 to couple the motor 830 with the hinge 805. Gear teeth of the gear 815 can be coupled with or engage with gear teeth of the gear 820. When the motor 830 drives the gear 815, the motor 830 can drive the appendage 105 through the hinge 805. For example, the motor 830 can turn the gear 815, which can turn the gear 820, which can turn the gear 825 to turn the appendage 105.

Figure 11:
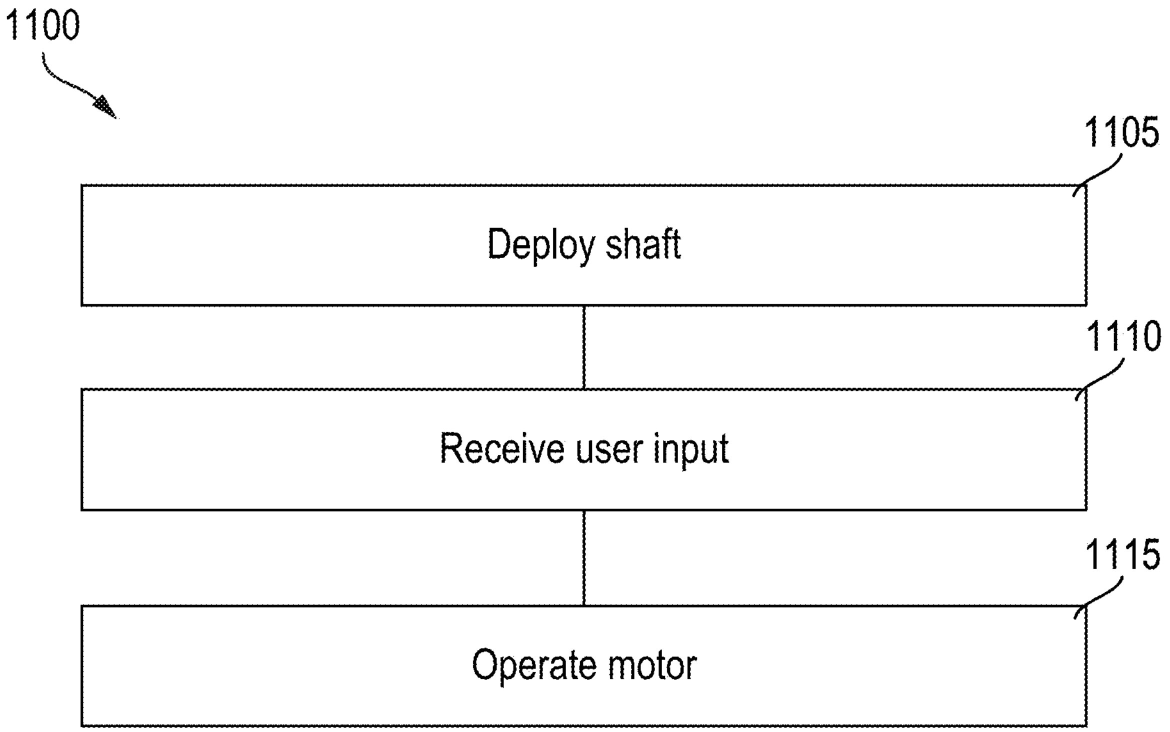
FIG. 11 is a method of operating the power tool of FIG. 1, according to an example embodiment.

FIG. 11 is a method 1100 of operating the apparatus 100, according to an example embodiment. The computing system 835, the motor 830, the hinge 805, or any other component of the apparatus 100 can perform at least a portion of the method 1100. Block 1105 can include deploying a shaft. The block 1110 can include receiving user input. The block 1115 can include operating a motor.

At block 1105, the method 1100 can include deploying the appendage 105. For example, responsive to a button 155 being pressed, the lock-pin shaft 810 can unlock or release the appendage 105. A spring or tensile member can move the appendage 105 from the stowed position to the deployed position responsive to the button 155 causing the lock-pin shaft 810 to release the appendage 105. The appendage 105 can turn on the gear 825 about the gear 820 of the lock-pin shaft 810. When the appendage 105 reaches a fully deployed position, the appendage 105 can be locked into position by the lock-pin shaft 810.

At block 1110, the method 1100 can include receiving user input. For example, a user can interact with an input device 145 or an input device 150. The computing system 835 can receive a signal indicating that a user has pressed one of the input devices 145 or 150. The input device 145 can provide a signal to indicate that the appendage 105 should turn in a first direction. The input device 150 can provide a signal to indicate that the appendage 105 should turn in a second direction.

At block 1115, the method 1100 can include operating a motor 830. For example, the computing system 835 can cause the motor 830 to spin in a particular direction. For example, responsive to receiving a first signal from the input device 150, the computing system 835 can cause the motor 830 to rotate in a first direction to cause the appendage 105 to be rotated about the longitudinal axis 845 through the gears 815, 820, and 825. For example, responsive to receiving a second signal from the input device 145, the computing system 835 can cause the motor 830 to rotate in a second direction to cause the appendage 105 to be rotated in a second direction about the longitudinal axis 845 through the gears 815, 820, and 825.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the disclosure as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

What is claimed is:

1. A power tool comprising:

an outer casing forming a housing;

a motor;

a motor-driven appendage having a distal end, a proximal end, a secured portion, and an unsecured portion, the secured portion positioned near the proximal end, anchoring the motor-driven appendage within the housing, and the unsecured portion consisting of a portion of the motor-driven appendage distal to the secured portion;

a hinge mechanism having a hinge axis between an appendage-leg and a motor-leg, the appendage-leg comprising the motor-driven appendage and the motor-leg comprising an output shaft affixed to the motor;

wherein the motor-driven appendage has a closed state and an open state, the closed state defined by the unsecured portion fully contained within the housing, and the open state defined by the unsecured portion being in the space external to the outer casing, wherein the hinge axis is a lock-pin shaft, wherein the lock-pin shaft engages to render the motor-driven appendage in a locked position to restrict the motor-driven appendage from hinging about the hinge axis and disengages to render the motor-driven appendage in an unlocked position to enable the motor-driven appendage to hinge about the hinge axis.

2. The power tool of claim 1, wherein:

the housing comprises an appendage port adjacent to the secured portion and capable of housing the unsecured portion;

the outer casing comprises an aperture creating consecutive space between the appendage port and a space external to the outer casing, the aperture shaped to allow the unsecured portion to pass through it, laterally and longitudinally; and the motor-driven appendage moves between the closed state and the open state by hinging about the hinge axis and by laterally passing through the aperture.

3. The power tool of claim 1, wherein a battery powers the motor.

4. The power tool of claim 1, wherein a microprocessor couples the motor to a battery configured to power the motor.

5. The power tool of claim 1, wherein an angled hinge-blade maintains the motor-driven appendage perpendicularly to the lock-pin shaft.

6. The power tool of claim 1, wherein the motor-leg comprises a proximal pinion gear affixed to the output shaft; and wherein the proximal pinion gear articulates with a bevel gear through a plurality of gears.

7. The power tool of claim 1, wherein:

the appendage-leg comprises the proximal end of the motor-driven appendage connected to a distal pinion gear;

the distal pinion gear articulating with a bevel gear, either directly, or indirectly, through a plurality of gears; and the motor-driven appendage hinges about the hinge axis using the distal pinion gear's articulation with the bevel gear through the plurality of gears.

8. The power tool of claim 1, wherein the outer casing is compact such that it fits within one's pocket and within a palm of one's hand.

9. A power tool comprising:

an outer casing forming a housing;

a motor;

a motor-driven appendage having a distal end and a proximal end;

the proximal end of the motor-driven appendage connected to a distal pinion gear, the distal pinion gear articulating with a bevel gear through a plurality of gears;

the bevel gear affixed to a lock-pin shaft, the lock-pin shaft extending perpendicularly from the bevel gear, in axial alignment;

the bevel gear further articulating with a proximal pinion gear, either directly or indirectly, through a plurality of gears;

the proximal pinion gear affixed to an output shaft; the output shaft affixed to a motor; and the lock-pin shaft acting as a hinge axis about which the motor-driven appendage hinges; the lock-pin shaft engaging to restrict the motor-driven appendage from hinging about the hinge axis in a locked position and disengaging to enable the motor-driven appendage to hinge about the hinge axis in an unlocked position.

10. The power tool of claim 9, wherein, in the locked position, but not the unlocked position, rotation of the proximal pinion gear translates to rotation of the motor-driven appendage through the proximal pinion gear's articulation with the bevel gear, either directly or indirectly, through the plurality of gears, and through the bevel gear's articulation with the distal pinion gear, either directly or indirectly, through the plurality of gears.

11. The power tool of claim 9, wherein an angled hinge-blade holds the proximal end of the motor-driven appendage perpendicularly to the lock-pin shaft.

12. The power tool of claim 9, wherein the outer casing is compact such that it fits within one's pocket and within a palm of one's hand.

13. The power tool of claim 9, wherein a microprocessor couples the motor to a battery configured to power the motor.

14. The power tool of claim 13, wherein the power tool has a first directional button and a second directional button, wherein:

the first directional button is coupled to the battery, the motor, and the microprocessor such that pressing the first directional button causes rotational movement of the motor-driven appendage in a clockwise direction, and the second directional button is coupled to the battery, the motor, and the microprocessor such that pressing the second directional button causes rotational movement of the motor-driven appendage in a counter-clockwise direction.

15. The power tool of claim 13, wherein the power tool has a speed switch that communicates with the battery, the motor, and the microprocessor such that when mechanically manipulated, the speed switch varies a speed at which the motor-driven appendage rotates.

* * * * *